6/21/83  OR  4,389,560

United States Patent [19]

Mitchell

[11] 4,389,560
[45] Jun. 21, 1983

[54] LASERS

[76] Inventor: Wilbur A. E. Mitchell, 1329 - 11th Ave., Greeley, Colo. 80631

[21] Appl. No.: 253,034

[22] Filed: Apr. 10, 1981

[51] Int. Cl.³ .............................................. B23K 27/00
[52] U.S. Cl. ................................. 219/121 L; 373/166
[58] Field of Search ..... 219/121 L, 121 LM, 121 EB, 219/121 EM; 422/22–24; 373/166

[56] References Cited

U.S. PATENT DOCUMENTS

| | | | |
|---|---|---|---|
| 2,943,174 | 6/1960 | Parker | 219/121 EB X |
| 3,803,319 | 2/1967 | Steigenwald | 219/121 EB X |
| 4,142,088 | 2/1979 | Hirsch | 219/121 LM X |

Primary Examiner—C. L. Albritton
Attorney, Agent, or Firm—Wilbur A. E. Mitchell

[57] ABSTRACT

This invention is the new use of a Laser light beam directed into a metal fire pot as the combined heater element causing oxidation of the metal fire pot, for a heating system.

2 Claims, 2 Drawing Figures

LASERS

SUMMARY OF THE INVENTION

Lasers are of several types, namely, of a solid state, such as of ruby or neodymium, and of a gas, such as of carbon dioxide or helium-neon, among others.

I use a ruby solid state laser as the fuel means in a heater metal fire pot for a heating system. The laser light beam is projected into a closed metal fire pot, of suitable enclosure, such as a ball, resulting in oxidation causing a heating of the metal. Such a laser would be from a 100 watt power size to upwards of 5 kw (5000 watts), depending upon the size of the metal heater enclosure fire pot to be heated. In the case of a relatively small furnace heater, the metal fire pot would be of an iron enclosure, into which the laser light is directed, and with the iron approximately ¼ inch thick. Such a fire pot is designed as an iron ball or separable sphere enclosure of approximately 10 to 20 inches inner diameter, in the form of two half spheres bolted together, as illustrated. A suitable reflector metal mirror of stainless steel or molybdenum and of convex shape is secured within the metal pot, in position to reflect and distribute the laser beam internally of the pot. Several of such reflectors may be so inserted, as illustrated. The laser operation directing its beam into the pot, and as reflected by the mirrors against the interior of the pot, causes the metal of the pot to be thereby oxidized and causes a heating of the metal fire pot.

This Application does not attempt to explain much about the mechanism, operation or structure of lasers, nor details of the various possible lasers, as now available on the market. Reference to lasers might be to M. J. Beesley's book on "Lasers And Their Applications" among others. Only a solid state ruby laser is diagrammatically illustrated hereby. The new use of lasers is the principle subject of this invention.

The solid state ruby or neodymium laser is limited in its pulse repetitional light beam projectioning, and has to be guarded against causing overheating of the lamp as well as of the metal inner heater fire pot, due to the large amount of heat dissipated by the flash-laser lamp. Preferably it is desirable only to have pulses occur every few seconds when a ruby laser is used to prevent overheating. An iron fire pot with a suitable laser adapted to project its beam thereinto, is placed within a conventional hot air furnace shell housing, and with the housing completely encompassing the fire pot. The laser light pulse operation is controlled by an electric switch within the furnace enclosure for automatically controlling the electric on and off operation of the laser when the thermostat of the residence to which connected calls for heat, and when the heat within the furnace housing is less than approximately 180°. Then the laser is operated until the thermostat is satisfied, in periodic laser pulse repetition, until that laser beam operation fire pot oxidation caused heat is raised within the residence to the thermostat setting, or until the heat in the furnace housing reaches a predetermined setting temperature point of approximately 180°, when that switch cuts off or opens the electric current connection to the laser to stop laser operation. It will be understood in such a furnace that there is also a conventional on and off electric switch for operating a conventional blower fan to blow the heat from around the exterior of the heated furnace fire pot and distribute the heated air into the building duct heater system. The fan operates to blow the hot air away from the furnace into the tubes to heat the building when the heat in the structure around the ball in the furnace shell is in excess of 160°, and then the fan continues until it is turned off by the switch when the operation of the fan and circulation of the air is lowered to a temperature in the furnace housing of approximately 130° is reached, in conventional manner as to the operation of the on and off switch and the on and off fan operation. Iron melting point being 2940°, and such on and off operation just explained assures that an iron furnace fire pot is not melted by the laser running too long in its operation and thereby overheating that iron pot, as the pot should not be heated over 1000° during operation of the laser, in the case of a small residential furnace hot air heater.

This invention, among others, is the method of using a laser light and directing it against the inside of an iron or other metal pot enclosure heater, by projecting the light therein and against the inner iron surface of that heater enclosure, to thereby heat the iron enclosure by the metal, as iron, oxidizing by the light, and then using that heated enclosure to furnish the needed heat for the desired purpose. That use or purpose can be either to heat air or to heat water or other element surrounding the fire pot.

In the case of an average small size hot air residential furnace, it would have about a 20 inch cast iron furnace fire pot enclosure, of ¼ inch thickness, and about a 500 watt solid state laser therewith, as illustrated, to do the heating job adequately.

Small neon-helium gas lasers, of a size of 0.5 mw upwards to 3.5 mw, are available on the market and are relatively inexpensive, but they are not strong enough per se to accomplish a sufficient metal fire pot heating.

A larger laser, in industrial heating use, in the form of either a solid state laser or a gas laser, such as from 250 watt up to a 20 kw (20,000 watt) laser light in size light beam, is needed, depending upon size of the heater fire pot to be heated. A large 20,000 or more watt laser would be used to oxidize a suitable metal fire pot enclosure in a power plant, as the heat energy source, instead of thermo-nuclear energy source.

OBJECTS OF INVENTION

From the foregoing brief description and the hereinafter drawing and explanation, it will be apparent that the objects of this invention are:

1. The provision of a laser heater, comprising the combination of a laser light unit beam and a metal heater fire pot, into which pot the laser beam is projected to strike against the inner walls of the pot, for resultant oxidized heating of the pot walls.

2. The use of a laser light beam against a metal heater pot to cause oxidation of the metal pot and thereby heat air or water as may surround the metal pot and within a heater enclosure around the pot.

3. The method of using a laser light beam to strike against a metal heater fire pot inner surface, with the fire pot surrounded by either air, water or other element, for effecting oxidation and heating of the iron pot by the light beam on contacting said pot metal surface, for pot heating of the surrounding air or water around the pot, as the case may be.

DETAILED DESCRIPTION OF PREFERRED EMBODIMENT

Figure 1:
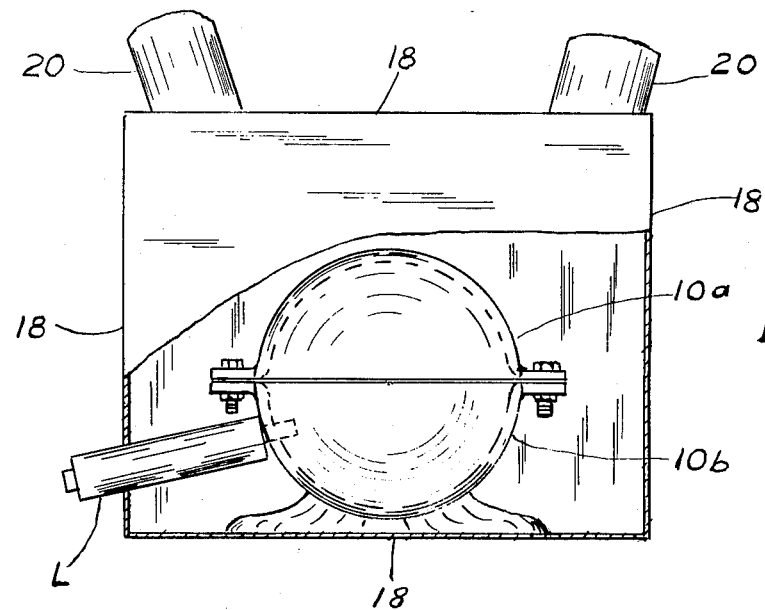
FIG. 1 is a side elevational partially exploded view of a hot air heating so-called furnace, having my new use combination of a laser with a metal fire pot as the heater element.
Figure 2:
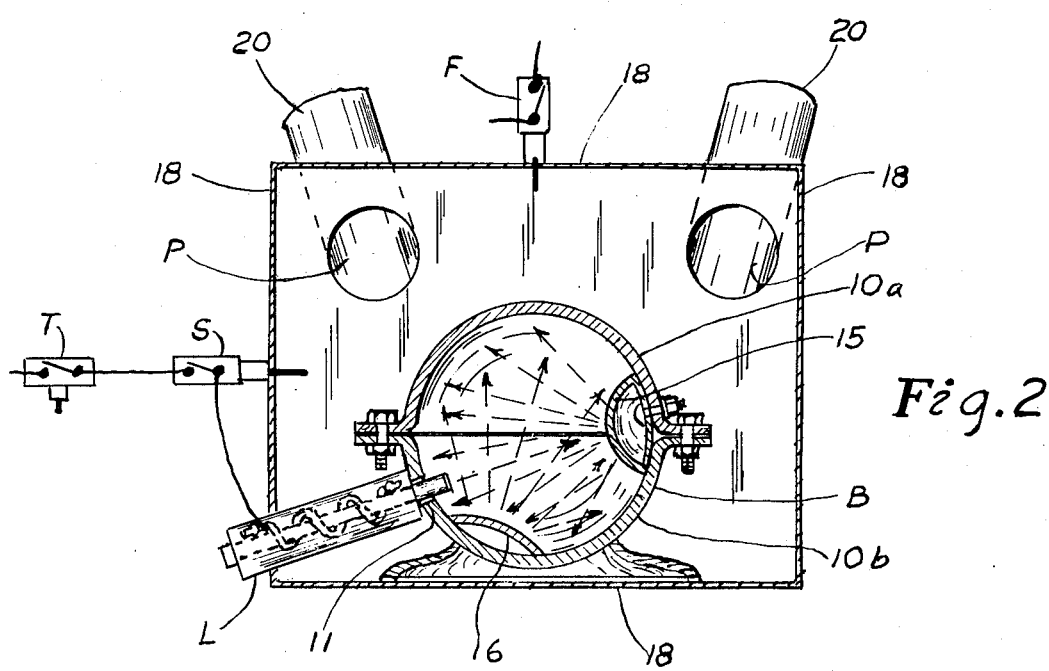
FIG. 2 is a vertical cross-sectional view thereof taken of the view of FIG. 1, and diagrammatically of the laser thereof.

I form a metal fire pot of cast iron in the form of two semi-spherical pieces, 10a and 10b, in the case of a furnace for a small residence, being of cast iron, and with the two half spheres, bolted together to form a sealed enclosure. The lower one of the half spheres 10b has a small opening 11 as indicated. A furnace shell palenium enclosure 18 completely spacedly surrounds the assembled fire pot ball B. A suitable laser preferably solid state as a ruby laser unit, indicated as L, is secured with its lens scope exteriorly of the ball B and with the lens entirely within and positioned in said opening 11. Within the ball B a suitably convex reflector mirror 15 is secured to be in a position immediately longitudinally aligned and opposite from the laser lens. That mirror 15 is so positioned, so that the laser beam, upon operation of the laser light L, will strike directly onto the approximate center of the reflector 15, and so that the convex surface of the reflector will reflect that beam therefrom and toward the approximate substantial inner area of the ball B. That reflector mirror can be of various coating to effect that reflection. It will be understood that some of the laser beam will be absorbed by that reflector and thereby oxidizingly create heat within the ball thereby. A different size and extra positioned other reflector 10 can be placed as illustrated within the ball to redirect the reflected beam from 15 within the ball, and that second reflector, indicated as 16, is desirably of a molybdenum coating to permit reflection without absorption of the light, as far as possible. It will be understood that when the laser beam, thus reflected, strikes any and every part of the inner surface of the fire pot ball, that said laser light affects an oxidation thereof and in turn causes a heating of the ball.

A suitable electric connection and switch, indicated as F, to a fan (not shown) limit switch is provided conventionally as a thermal fan limit control switch within the furnace palenium area of the housing 18 and exteriorly of the ball, and is preset to close the electric circuit to the fan to operatively run the fan and pull the hot air out of the palenium area outside the fire pot B, and distribute the heated air to the building where the unit is operating through pipes 20, when the heated air within the palenium has reached a certain preset temperature, and continues to operate the fan until that temperature is reduced to a minimum preset temperature.

Another conventional electric circuit and thermostat switch, T, is connected to the laser light L, to control the operation of that light, conventionally as to that switch. When the thermostat T is adjusted within that building, to call for heat from the furnace, and when the thermostat is set at a certain temperature to close the circuit, that then the laser operates by its beam within the fire pot B and against the mirrors 15 and 16. Those mirrors reflect the beam within the pot, and as explained, oxidation of the metal pot occurs as a result of that light within that metal pot. The pot then becomes heated and heats the air within the palenium 18 until the thermostat heat within the building is satisfied when the switch T is opened and the electricity to L turned off. A safety switch S is conventionally used in the electric circuit between the thermostat T and the laser L, to open and turn off the electricity to stop L operation in the event and upon the heat within the palenium 18 reaching a certain maximum preset temperature, for safety, should the laser operation continue beyond that preset temperature.

This new use of a laser light beam directed into or against a metal fire pot to oxidize the metal and thereby heat the metal fire pot, may, obviously, be used in addition to the hereinbefore explained and pictured hot air furnace embodiment, namely that new size is very adaptable for hot water heating, as the heater unit in a suitable hot water heater. Such a water heater use is advantageous because circulating water heated by and circulating around the fire pot helps to protect the pot and the laser from becoming overheated during laser operation. This novel heating combination use may also be used as the heater unit within a low pressure vapor, or a high pressure steam heater boiler, with obvious suitable combinations of the fire pot into metal tubes into which the laser beam would be directed. Also this new use of a laser beam can be used to heat and generate steam in an electric generating power plant.

Suitable amplification can be employed to perfect the efficiency of the laser light beam when projected and reflected within and against the metal of the fire pot to effect oxidation heating, when a low power level laser is used, necessarily to increase the efficiency of the light beam. A carbon dioxide amplifier would be used with high power. Nevertheless, the new use of a laser beam, in combination as hereinbefore taught, is considered meeting the need for a cheaper fuel for average size residence heating, as prevailing natural gas heating systems are becoming too expensive to the average home owner because natural gas rates are constantly going up in cost. The cost of electric energy, when converted as hereinbefore taught with the laser, could be the answer for the average home heating plant.

This invention is the new combination of a laser of suitable size wattage and of a metal fire pot, and directing the laser beam against the pot on laser operation to thereby effect oxidized heating of the pot, for pot heating of the area surrounding the pot and in which area there may be air or water or other.

Having thus explained a preferred embodiment of this invention and also other uses in addition to the preferred embodiment, I wish to be bound only by the hereunto appended claims.

What I claim and desire to secure by Letters Patent is:

1. In combination, a laser heater enclosed furnace having, an iron heater fire pot therein, an operable electrically controlled laser light of upwards of 20,000 watts associated with the fire pot and adapted on light operation to project its light beam into the fire pot, a reflector mirror within the fire pot in position and adapted to reflect the laser light beam within the fire pot on laser operation, temperature electric control means internally and exteriorly of the furnace and exteriorly of the fire pot for electrically controlling operation of the laser light, whereby, upon operation of the laser light, that light is absorbed by the iron fire pot and the fire pot is oxidized and heated proportionally to the laser light wattage and duration of operation.

2. In combination, a heater having an enclosure and an iron heater fire pot therein, an operable laser light beam unit of upwards from 5 watts to 20,000 watts associated with the fire pot and adapted on operation to project a laser light beam into the fire pot, and temperature control means associated with the fire pot and adapted for electrically controlling operation of the laser unit, whereby upon laser unit light beam operation its light beam projected into the fire pot is absorbed by the pot and thereby oxidation heating of the fire pot occurs.

* * * * *

UNITED STATES PATENT OFFICE
CERTIFICATE OF CORRECTION

Patent No. 4,389,560            Dated June 21, 1983

Inventor(s) Wilbur A. E. Mitchell

It is certified that error appears in the above-identified patent and that said Letters Patent are hereby corrected as shown below:

In Column 4, Line 7, "size" is deleted and instead the word --use-- is substituted; and In Column 4, Line 22, "oxidation" is deleted and instead the word --oxidization-- is substituted.

Signed and Sealed this

Sixteenth Day of August 1983

[SEAL]

Attest:

Attesting Officer

GERALD J. MOSSINGHOFF

Commissioner of Patents and Trademarks